US006866810B2

(12) United States Patent
Ahmed et al.

(10) Patent No.: US 6,866,810 B2
(45) Date of Patent: Mar. 15, 2005

(54) TREATMENT OF PLASTICS CONTAINERS

(75) Inventors: Qamar Uddin Ahmed, Huntingdon (GB); Michael David Christy, Houghton (GB); Phillip Andrew Wallis, Polebrook (GB)

(73) Assignee: Harcostar Drums Limited, Cambridgeshire (GB)

( * ) Notice: Subject to any disclaimer, the term of this patent is extended or adjusted under 35 U.S.C. 154(b) by 598 days.

(21) Appl. No.: 09/771,083

(22) Filed: Jan. 26, 2001

(65) Prior Publication Data

US 2001/0043997 A1 Nov. 22, 2001

(Under 37 CFR 1.47)

(30) Foreign Application Priority Data

May 20, 2000 (GB) ............................................ 0012170

(51) Int. Cl.[7] ............................ B05D 3/06; B29C 35/08

(52) U.S. Cl. ........................... 264/446; 264/83; 264/85; 264/104; 264/105; 264/129; 264/297.1; 264/447; 264/494; 427/230; 427/235; 427/236; 427/412.3; 427/421; 427/424; 427/508; 427/512; 427/521; 427/536; 427/553; 427/557; 427/558

(58) Field of Search ............................ 264/83, 85, 104, 264/105, 129, 297.1, 446, 447, 494; 427/230, 235, 236, 412.3, 421, 424, 508, 512, 521, 536, 553, 557, 558

(56) References Cited

U.S. PATENT DOCUMENTS 4,150,164 A 4/1979 Gerek et al.
4,598,022 A 7/1986 Haque et al.
6,435,225 B2 * 8/2002 Christy ........................ 141/48

FOREIGN PATENT DOCUMENTS

| | | | | |
|---|---|---|---|---|
| EP | 0575798 | A1 | | 12/1993 |
| GB | 2207368 | A | | 2/1989 |
| GB | 2219270 | A | | 12/1989 |
| JP | 056081344 | A | * | 7/1981 |
| WO | 95/22413 | A1 | | 8/1995 |
| WO | 00/78469 | A2 | | 12/2000 |

* cited by examiner

*Primary Examiner*—Leo B. Tentoni
(74) *Attorney, Agent, or Firm*—Andrus, Sceales, Starke & Sawall, LLP

(57) ABSTRACT

A treatment method for the internal surface of a molded polyethylene plastics material container such as a drum, including the steps of: introducing an ionizable gas, such as argon, into the container; generating a plasma of the introduced gas by applying electric field of sufficient strength to the container and introduced gas, so as to cause an interaction with the internal surface of the container; coating the internal surface of the container with a curable epoxy-based first polymeric composition; and then curing the polymeric composition to form a coating on the internal surfaces of the container. A second coating, preferably with electrical conductive properties, may be applied and cured over the first coating. Conductive properties may be provided by including conductive particles such as antimony doped tin dioxide, graphite or metal powders, in the second composition.

26 Claims, 4 Drawing Sheets

TREATMENT OF PLASTICS CONTAINERS

BACKGROUND OF THE INVENTION

A) Field of the Invention

This invention relates to a treatment method for the internal surface of a moulded polyethylene plastics material container, and also to such containers whenever treated by the method of this invention.

B) Description of the Prior Art

Moulded plastics material containers are very widely used in industry for the storage and transport of very many different products including liquids, powders, granules and other flowable products. As compared to steel containers, moulded plastics material containers have several advantages, including corrosion resistance, resilience restoring the original shape if distorted, resistance to bursting, electrical and thermal insulation, and the ability to be self-coloured. However, the industrial acceptance for the storage and transport of solvents, solvent-containing products and various chemicals has been limited since the plastics materials from which containers are made are susceptible to attack by various chemicals encountered in industry.

Plastics material containers are being used more widely as various techniques are developed for increasing the resistance to chemical attack of the materials from which the containers are made, or by developing barrier layers for coating on the container walls to isolate the material of the container from contained substances. For example, both small domestic petrol cans and motor vehicle petrol tanks are now made from plastics materials, and demonstrate sufficient insolubility and resistance to puncturing for such containers to present no greater risk than would a steel container for petrol.

A particular problem arises in the case of containers moulded from polyethylene. Many industrial solvents can attack polyethylenes, and attempts to coat the surfaces of a polyethylene container with solvent-resistant materials have largely produced unacceptable results. The surface of moulded polyethylene is not at all receptive to conventional coating compositions used to form barrier layers and even should a suitable composition be deposited on the surface, the adherence of that composition tends to be very poor, leading to localised breakdown. This is especially so if the container walls are flexed either deliberately or accidentally, by more than some relatively small amount. The term polyethylene as used throughout the specification is intended to encompass pure polyethylene as well as mixtures of polymers which include polyethylene or polyethylene together with other substances such as fillers or reinforcing agents.

A further problem associated with the industrial use of polyethylene containers is that it is very easy for a static charge to build up on a container when the container is being transported, filled or emptied with a product, consequent upon product friction and/or handling (tribocharging). This can occur with either powders or liquids.

SUMMARY OF THE INVENTION

The present invention stems from extensive research into ways of applying highly adherent and chemically resistant barrier layers on the surface of blow-moulded polyethylene containers.

The present invention provides a treatment method for the internal surface of a moulded polyethylene plastics material container, comprising the steps of:

introducing an ionisable gas into the container;

subjecting the container and introduced gas to an externally-applied electric field of sufficient strength to generate a plasma of the introduced gas, for a period of time sufficient for the plasma to cause an interaction with the internal surface of the container;

removing the electric field from the container;

coating substantially the whole of the internal surface of the container with a curable epoxy-based first polymeric composition; and then introducing into the container a source of electromagnetic radiation suitable to cure the first polymeric composition to form a coating on the container internal surfaces.

In the method of this invention, a moulded plastics material container is subjected to a multi-stage treatment to ensure that a continuous barrier coating is formed uniformly on the internal surfaces of the container, and that once cured, the coating adheres particularly strongly to the container. If the container is then subjected to local deformations, it is highly unlikely that the integrity of the coating will be impaired, so giving excellent reliability.

BRIEF DESCRIPTION OF THE DRAWINGS

In order that the invention may better be understood, certain preferred aspects of it will now be described in detail and a specific embodiment of apparatus for performing a container treatment method of this invention will also be described. The accompanying drawings show that embodiment, in which.

DETAILED DESCRIPTION OF THE PREFERRED ARRANGEMENTS

Figure 1:
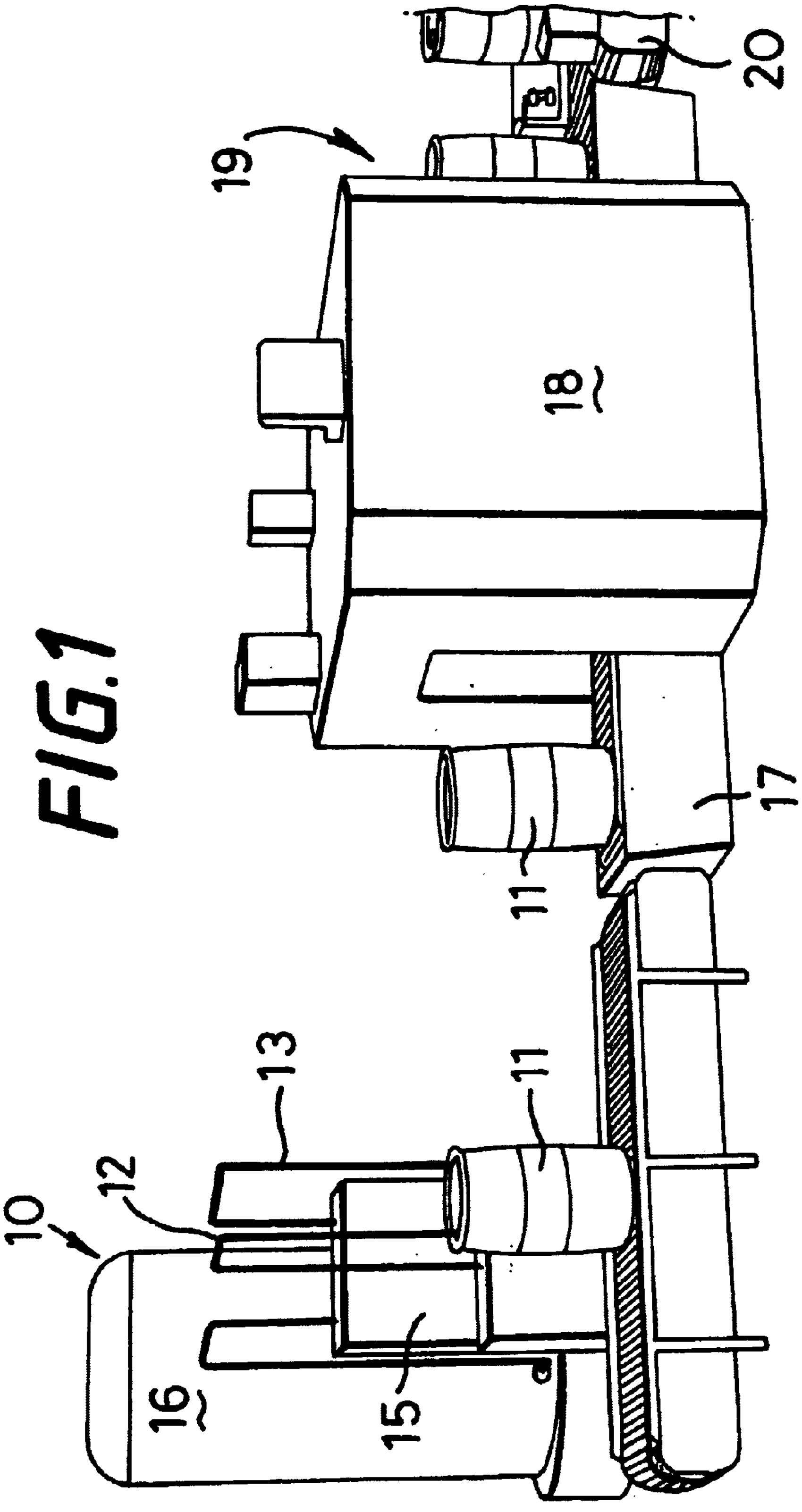
FIG. 1 is a diagrammatic view of the first part of a preferred embodiment of apparatus of the present invention showing the first stages.

In many applications for containers to be treated according to the present invention a single coating of the first polymeric composition may be sufficient. However, it is often desirable to improve the quality or thickness of the coating, and therefore the degree of protection it affords.

Consequently, according to a preferred embodiment of the present invention there are further provided the additional steps of:

coating substantially the whole of the container internal surface, over the cured first coating, with an epoxy-based second polymeric composition; and then introducing into the container a source of electromagnetic radiation suitable to cure the second polymeric composition to form a second coating.

As discussed above, plastics containers can be subject to a build up of static charge. It is therefore highly advantageous to provide a means for discharging this static build up. Whilst it is possible to include a charge-dispersing substance in the epoxy-based first polymeric composition which is applied to the internal surface of the container, this can have detrimental effects on the solvent-resistant characteristics of that coating. Preferably, therefore, the second coating composition includes electrically-conductive particles.

When the second polymeric composition is primarily intended to act as a static charge dispersing coating and not primarily as a barrier to solvents, it is not essential that the second coating covers all of the internal surfaces of the container. However, the second coating should coat at least the majority of the internal surface of the container so that the second coating can effectively dissipate any static build up.

In order to increase its conductivity, the second coating preferably contains one or more of particles treated to render them conductive, metal powder, graphite and conductive polymers. Most preferably, the second coating contains flakes or platelets of mica treated for example by coating the mica flakes or platelets with tin dioxide doped with antimony. An advantage of using mica flakes or platelets is that in addition to rendering the second coating conductive, they may also serve to reinforce the second polymeric composition layer.

The gas, conveniently referred to as a plasma gas, introduced into the container is preferably substantially inert having regard to the material of the container and the subsequent electro-treatment step. In addition, the gas should be readily ionisable to facilitate the surface treatment of the container. For example, the gas may be selected from argon, nitrogen, neon and tetrafluoroethylene. Treatment may also be possible with more reactive gases, such as halogens, halogenated gases or oxygen. Though the electro-treatment may be performed with only one plasma gas, for certain container materials it may be advantageous to employ a mixture of two or even more plasma gases. Before charging of the container with plasma gas the container is full of air. During charging the majority but not all of the air is displaced by introduced plasma gas. The remaining air mixes with the plasma gas so that just prior to the application of the electric field the composition of gases within the container may be approximately: 60–70% plasma gas (or gases); with the remainder comprising air. This gives an amount of atmospheric oxygen of about 6–8%.

The plasma gas is ionised by means of an externally-applied electric field, to promote interaction between gases in the container and the constituents of the internal surface of the container so as to modify chemically and physically the internal surface. In a preferred electro-treatment step, the electric field to which the container and gas are subjected should be of the order of 5 to 10 kV/cm, though better results may be achieved by a higher field strength, such as up to 15 kV/cm. To ensure effective treatment, the container and introduced gas may be subjected to an electric field both transversely of the container and from top to bottom. Depending upon the container size and material, the plasma gas employed and also the electric field strength, the container and introduced gas may be subjected to the electric field for a period of from 10 seconds to several minutes, and preferably less than about 60 seconds.

Typically, the only or (if two are used) both coatings can consist of long chain aliphatic epoxy resins which are capable of being cross-linked by initiators activated by electromagnetic radiation with wavelengths in the UV or infra-red ranges. Control of the viscosity as well as improved cross-linking may be achieved by the addition of chemically compatible diluents. In order to permit effective spraying it is preferred that the compositions are maintained at an appropriate temperature during the spraying process. Application of the only or both coatings may normally be undertaken by the adaptation of standard spray techniques.

Once cured, the first coating may act as a preventative barrier to absorption and permeation of the container, by certain solvents, such as xylene, benzene, toluene, petroleum distillates and some halogenated hydrocarbons, and if present, the second coating may serve to improve the resistance of the barrier to these solvents and may additionally discharge any static charge which might otherwise occur.

The apparatus shown in the drawings and described below is intended for the treatment of moulded polyethylene plastics containers such as industrial barrels, drums and jerry cans (i.e. a container having a top handle and an off-set neck) suitable for the storage and transport of various chemicals in liquid, flowable powder or granular form. Such containers may be manufactured by a blow-moulding operation from polyethylene typically of a medium to high molecular weight as is well known and understood in the art, and which will not therefore be described in further detail here.

The apparatus comprises a series of stations at which the various treatment steps are performed on the containers. A suitable conveyor arrangement (not shown) is provided to supply a succession of moulded containers to a gas charging station 10 whereat the containers 11 are charged with an ionisable gas—which in the present embodiment is argon, though other gases could be employed. This is done by connecting a pair of pipes 12 and 13 to screw-threaded necks provided round two openings in the top of the container during the manufacture thereof. Pipe 12 leads to an exhaust system 14 which may operate at a reduced pressure to assist filling, and pipe 13 leads from a valving arrangement 15 connected to a storage vessel 16 containing liquid argon. If a reduced pressure is established in the container care must be taken to ensure that the sides of the container are not distorted inwardly to an unacceptable degree.

At the gas charging station, the argon is introduced through pipe 13 into a connected container 11 and air, or an air/argon mixture, is removed by pipe 12 and the exhaust system 14. The filling pipe 13 may extend to the base of the container with the denser argon filling from the bottom and displacing the air. Alternatively, the argon may be introduced into container in such a way as to promote turbulent mixing of the argon with the air. As more argon is introduced the percentage of argon within the drum increases, and by analysing and monitoring the composition of gases leaving through tube 12 the filling may be continued until an appropriate mixture is obtained. The exhaust system may incorporate an argon extractor (not shown) so as to separate from the residual air drawn from the container any argon entrained therein.

Once the gases within the container have reached a suitable composition, the pipes 12 and 13 are disconnected from the container. The container is then moved on to a conveyor 17 which leads through an electro-treatment machine 18. Here, a relatively high alternating electric field is generated at least transversely across the path of advancement of the containers through the machine 18, by means of electrodes to each side of that path and across which is impressed a relatively high voltage. In order to optimise the treatment, it may be advantageous also to have electrodes above and below the path of advancement, and to which a relatively high voltage is also impressed. Typically, the pairs of plates may be 600 mm apart, and the impressed voltage in the region of 300 to 600 kV, giving rise to a field of approximately 5,000 to 10,000 V/cm through which the container passes. This is sufficient to ionise the argon (i.e. to generate a plasma of the argon) within the container to cause an interaction with the material at surface of the container and thereby give rise to the desired effect. It is believed that the mechanism for this interaction involves the argon plasma and oxygen remaining in the container as well as the internal surface thereof. This interaction modifies the polyethylene surface so as to render that surface more "wettable" and thus more receptive to a subsequently applied liquid. To achieve proper treatment within the machine 18, a container may typically take 60 seconds to pass therethrough on the conveyor 17.

From the outlet end 19 of the electro-treat machine 18, the containers are moved on to an intermittently driven conveyor 20, which advances the containers sequentially through an alignment station 21; two first coating composition applying stations 22 and 23; a resin purging station 24 and a first coating composition curing station 25. Each of these stations will be described below.

During the passage of a container through the electro-treat machine the containers are liable to rotate or move. Such rotation may cause miss-alignment between the openings on the top of the containers and parts associated with the subsequent process steps that must interact with those openings. Therefore after exit from the electro-treat machine the containers arrive at an alignment station 21 whereat the containers are positioned and orientated on the conveyor, in this example using drive means 26, for the subsequent steps.

The container is then advanced to the first polymeric coating application stage of the process. The first coating may be applied in a single operation, but in this example the coating is applied in two steps. At the first of the two first coating composition applying stations (numbered 22) half of the internal surfaces of the container are coated with a liquid curable epoxy-based resin composition. The liquid is pumped along pipe 27 to a spray head 28 of such a size that it may be inserted through one of the openings on the top of the container, and then manipulated in order to ensure coverage of half of the internal surfaces of the container with the composition. The container is then moved to the second of the two first coating composition applying stations (numbered 23), whereat liquid first coating composition is pumped through a second pipe 29 to a second spray head 30. The second spray head 30 is inserted through the other opening on the top of the container and is manipulated to ensure coverage of the remaining surfaces of the container.

The first coating, at least, has to be impervious to common solvents and their mixtures, and the second coating will preferably have such properties as well as having excellent static dissipation properties. Both coats are preferably cured by cross-linking in the presence of ultra violet light.

Two mechanisms exist for curing coatings by UV light. The first is termed "free radical" and involves the generation of a free radical from a photoinitiator such as benzophenone. The other mechanism of UV curing is "cationic initiation", which involves the generation of a super acid from its onium salt. In such cationic reactions the generation of the acid allows the curing to continue once the light source has been removed. This process, also known as dark cure, is very important when applied in closed spaces e.g. high molecular weight high density polyethylene (HMW-HDPE) drums which are coated closed but have many shadowed areas which may not cure under free radical UV curing.

Cationic UV curing involves the ring opening of an epoxide group to initiate the cross-linking, and this may involve a variety of electron rich substances reacting with the epoxides. The range of diluents is not restricted to those termed reactive diluents as a wide variety of chemicals react within these systems.

The first coating composition typically comprises a UV curing synthetic resin. For forming a clear UV lacquer which creates an impervious barrier on the surface of treated HMW-HDPE a typical composition would be composed of 83.2%–92.75% cycloaliphatic epoxide resin; 5%–10% divinyl ether; and 2%–6% photoinitiator. The extent to which the coating is impervious may be adjusted by varying the quantities of the constituents. Optionally an antistatic agent may be included in the first composition.

During spraying, a fine mist of suspended liquid droplets builds up in the interior of the container, and these droplets remain suspended after completion of spraying and removal of the spray head. If this mist remains during the curing phase, it is liable to cure directly onto the lamps at the curing station thereby drastically reducing their efficiency. Therefore, at the resin purging station 24, two pipes 32 and 33 are inserted through the openings into the container, and the remaining undesirable coating composition is extracted from the container. The process is continued until all airborne resin is removed. At the same time, argon and waste gases such as ozone (created in the electro-treat step) are also purged from the container. The waste products extracted from the container may be supplied to a separator (not shown) in order to make some of them available for re-use. It may also be desirable to start to remove such waste material during the spraying steps, and the in the current embodiment removal tubes 31 are also provided at the spraying stations to achieve this.

The container is then advanced to the first curing station 25. Here, a pair of relatively small, high intensity UV lamps 35 are inserted through the two openings in the top of the container. If appropriate these may be moved around within the container so as to better subject the liquid coating to UV radiation, however such movement is not needed if appropriately configured lamps are used. These lamps emit electromagnetic radiation with a wavelength within a suitable range to promote curing of the resin.

The cured resin of the first coating forms a solvent-resistant barrier layer on the internal surface of the container. Having regard to the treatments to the container prior to the application of the first coating composition, the liquid composition readily spreads over the surface of the container and, when cured, strongly adheres to the container walls.

Figure 2:
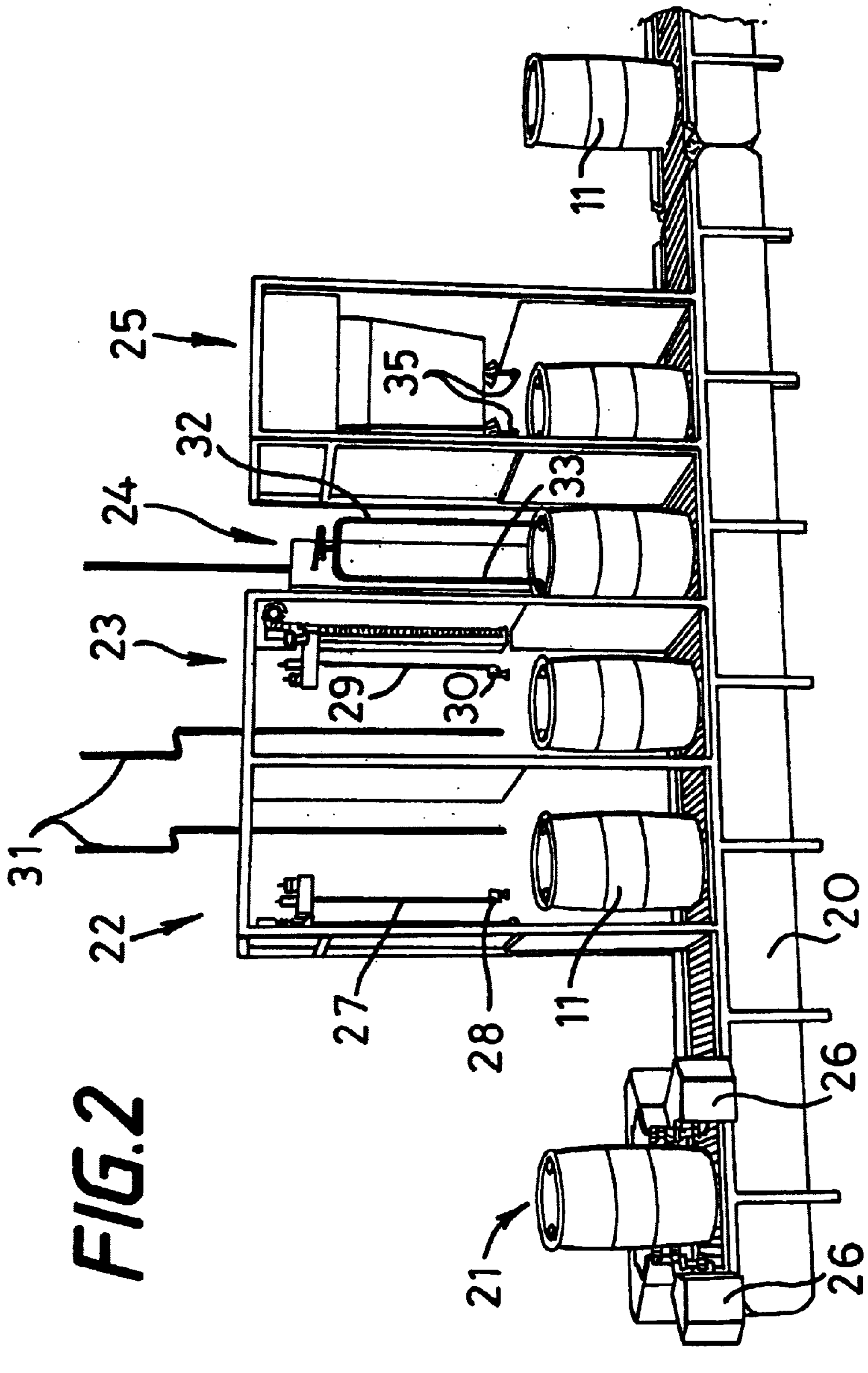
FIG. 2 is a diagrammatic view of the next part of the same apparatus showing the coating and curing stations for the first coating composition.
Figure 3:
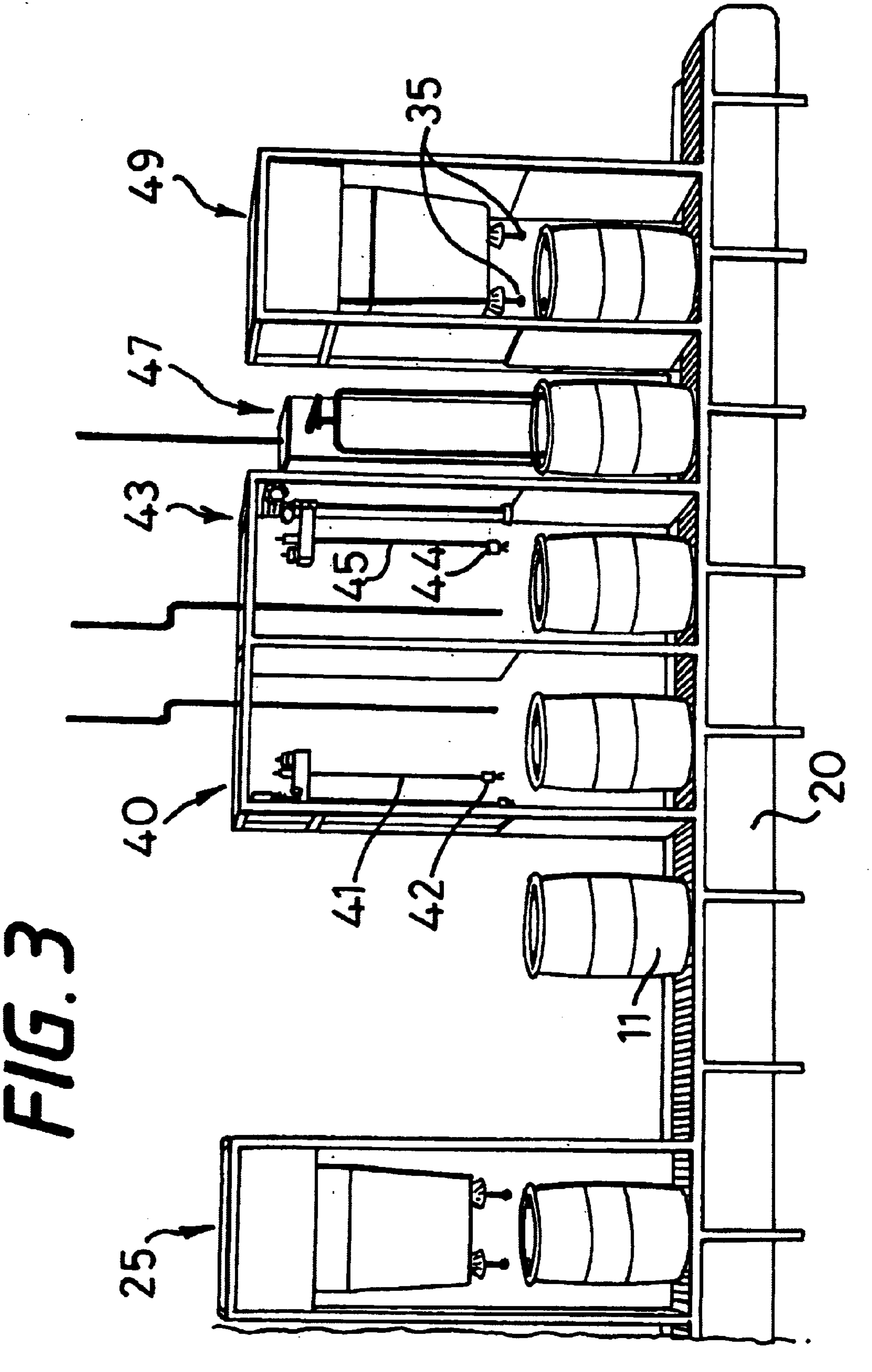
FIG. 3 is a diagrammatic view of the final part of the same apparatus showing a the coating and curing stations for the second coating composition.
Figure 4:
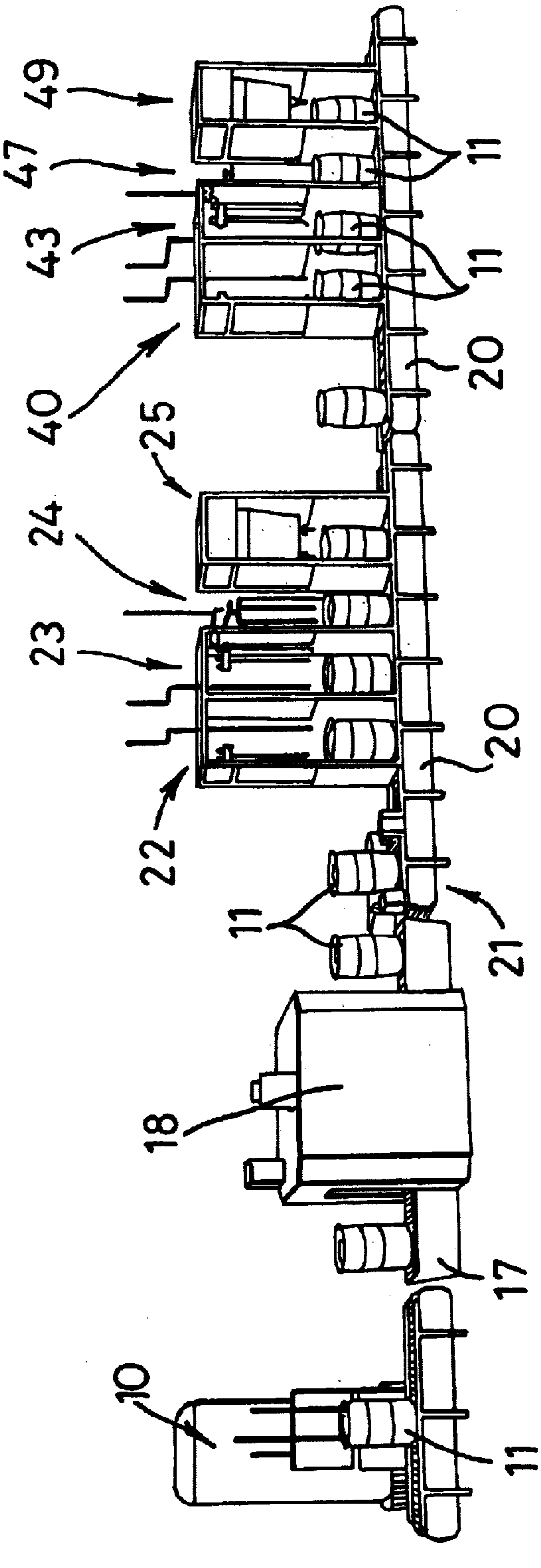
FIG. 4 is a complete view of the same embodiment shown in fragments in FIGS. 1 to 3.

A basic embodiment of the present invention is exemplified by a combination of the components shown in FIGS. 1 and 2 of the accompanying drawings. If the components of FIG. 3 are also employed after the first curing station 25 then a preferred embodiment having two distinct coatings is shown. This embodiment comprises all the steps of FIGS. 1 and 2, but has a second coating/curing phase.

The second coating/curing phase functions in a very similar fashion to the first coating/curing phase. A container 11 is sequentially indexed along a conveyor 20 into the first of two second coating spraying stations (numbered 40) whereat a second polymeric coating composition is applied to half of the internal surfaces of the container. This is done using a pipe 41 and a spray head 42 in the same way as described with above with reference to the first coating. The container is then moved to the second of two second coating composition applying stations (numbered 43) whereat a second spray head 44, fed through a second pipe 45, enters the container through the other opening and coats the remaining internal surfaces.

The second coating composition typically comprises a UV curing synthetic resin similar to that outlined above for the first coating, but as the second coating may be intended to be electrically-conductive, it may be further provided with a component that enhances conductivity. Usually this conductivity enhancing component comprises flakes or platelets of mica treated with antimony doped tin dioxide. Alternatively, the resin may be loaded with one of metal powders or graphite, or certain polymers may also work.

The antimony doped tin dioxide carried on the mica platelets confers electro-conductive properties to the cured epoxy resin. The flakes or platelets of mica, which serve as a carrier for the tin dioxide, are transparent to most electromagnetic radiation and so do not inhibit the curing of the composition. Moreover, the platelets serve to reinforce at least to some extent the cured composition.

A typical conductive second coating composition which forms a layer that dissipates the build up of static electricity on polymeric surfaces comprises 60%–70% cycloaliphatic epoxide resin; 5%–20% divinyl ether; 2%–6% photoinitiator; 7%–15% mica that has been coated with stannic oxide and doped with antimony; and wetting agents in the form of salts of polyamine amides in polar acidic esters and acetylinic diol type to give an even coating of conductive coat.

Traditional static-dissipative coatings have been based upon conductive carbon black, and for isocyanate cured or epoxy amine cured systems this is adequate as the driving force for the reaction is most likely to be accelerated by heat. In the present invention however it is important that electromagnetic radiation of certain wavelengths is able to pass through the anti-static agent thus allowing the coating to fully cure. As a consequence it is imperative for the process that the static dissipative agent has a degree of UV transparency in the wavelength range 350–500 nm. This would not be the case if carbon black were to be added as no UV light would pass through the coating at levels required for static dissipation.

In instances of high flash point liquids i.e. those with flash points above 23° C. it is not necessary to coat with a conductive coating. In these instances two non-conductive coats may be applied in order to improve permeability properties.

It has been found that whilst the application of a conductive coating directly on to the container may acceptable in some circumstances, it does not always give optimum results. In order to optimise the static charge dissipation properties of a finished container, an electrically conductive second coating may be applied over the first. The first coating not only provides an impervious barrier but also provides an even surface over which the conductive second coating can be applied. This even surface is advantageous because the preferred conductive additives have a lamella-shape and they better interact with a smooth surface to create an optimum conductive pathway.

After the application of the second coating the container is advanced to a second resin purging station 47 which operates in a similar fashion to the first resin purging station 24. By this stage there is little remaining gas to be purged, as this was achieved at the first stage. Instead this stage is primarily intended to remove excess resin.

After this the container progresses to the second curing station 49 and is cured in a similar manner to the curing of the first coating in the first curing station 25.

With the inclusion of electrically-conductive particles, the cured second coating composition forms an electrically conducting second coating, on the internal surface of the container. Having regard to the fact that the first and second coating compositions are essentially very similar, the second liquid composition readily spreads over the cured first coating of the container and, when cured, strongly adheres to the first coating. However, the addition of a wetting agent can help to optimise the spreading of the second coating composition.

What is claimed is:

1. A treatment method for the internal surface of a moulded polyethylene plastics material container, comprising the steps of:

introducing an ionisable gas into the container;

subjecting the container and introduced gas to an externally-applied electric field of sufficient strength to generate a plasma of the introduced gas, for a period of time sufficient for the plasma to cause an interaction with the internal surface of the container;

removing the electric field from the container;

coating substantially the whole of the internal surface of the container with a curable epoxy-based first polymeric composition; and then introducing into the container a source of electromagnetic radiation suitable to cure the first polymeric composition to form a first coating composition.

2. A treatment method as claimed in claim 1, which further comprises the subsequent steps of:

coating substantially the whole of the internal surface of the container over the cured first coating with a curable epoxy-based second polymeric composition; and then introducing into the container a source of electromagnetic radiation suitable to cure the second polymeric composition to form a second coating.

3. A treatment method as claimed in claim 2, in which the second curable epoxy-based polymeric composition has electrically conductive properties and includes at least one of particles of antimony-doped tin dioxide, graphite, metal powder and/or conductive polymers.

4. A treatment method as claimed in claim 2, in which the second composition includes antimony-doped tin dioxide and a carrier therefor.

5. A treatment method as claimed in claim 2, in which the second composition includes antimony-doped tin dioxide and on a carrier comprising platelets of mica.

6. A treatment method as claimed in claim 1, in which the gas introduced into the container is substantially inert.

7. A treatment method as claimed in claim 1, in which the gas is selected from the group consisting of argon, nitrogen, neon and tetrafluroethylene.

8. A treatment method as claimed in claim 1, in which the gas is selected from the group consisting of a halogen and a halogenated gas.

9. A treatment method as claimed in claim 1, in which the gases within the container prior to subjection to the electric field comprises 60–70% of the introduced ionisable gas, and the remainder air.

10. A treatment method as claimed in claim 1, in which the electric field to which the charged container is subjected lies in the range of from 5 to 10 kV/cm.

11. A treatment method as claimed in claim 1, in which the container and introduced gas are subjected to an alternating electric field.

12. A treatment method as claimed in claim 1, in which the container and introduced gas are subjected to the electric field for a period of from 10 seconds to several minutes.

13. A treatment method as claimed in claim 1, in which the container and introduced gas are subjected to the electric field for a period not exceeding 60 seconds.

14. A treatment method as claimed in claim 1, in which the curable epoxy-based polymeric compositions are based on cyclo-aliphatic epoxy resins.

15. A treatment method as claimed in claim 1, in which the curable epoxy-based polymeric compositions are in liquid form.

16. A treatment method as claimed in claim 1, in which the curable first epoxy-based polymeric composition is liquid and is introduced into the container by a spraying operation, directing liquid droplets at all of the internal surfaces of the container.

17. A treatment method as claimed in claim 2, in which the curable epoxy-based second polymeric composition is liquid and is introduced into the container by a spraying operation, directing liquid droplets toward at least the majority of the internal surfaces of the container.

18. A treatment method as claimed in claim 16, in which the spraying operation employs a spray head introduced into the container through an opening therein, and the spray head is manipulated to direct droplets on to substantially all of the internal surfaces of the container.

19. A treatment method as claimed in claim 17, in which the spraying operation employs a spray head introduced into the container through an opening therein, and the spray head is manipulated to direct droplets on to substantially all of the internal surfaces of the container.

20. A treatment method as claimed in claim 16, in which the spraying is a two stage operation employing two spray heads sequentially introduced into the container through openings therein, the first spray being manipulated to direct droplets on to substantially half of the internal surfaces of the container, and the second container being manipulated to direct droplets on to substantially the rest of the internal surfaces of the container.

21. A treatment method as claimed in claim 17, in which the spraying is a two stage operation employing two spray heads sequentially introduced into the container through openings therein, the first spray being manipulated to direct droplets on to substantially half of the internal surfaces of the container, and the second container being manipulated to direct droplets on to substantially the rest of the internal surfaces of the container.

22. A treatment method as claimed in claim 1, wherein a step of removing excess airborne liquid droplets is performed between spraying and curing of any coating.

23. A treatment method as claimed claim 1, in which the curable epoxy-based polymeric composition is cured either by being irradiated with ultra-violet radiation, infra-red radiation or by being heated.

24. A treatment method as claimed in claim 3, in which the curable epoxy-based polymeric second composition when cured forms an electrically conductive coating on the internal surfaces of the container.

25. A treatment method as claimed in claim 1, in which a plurality of containers are treated consecutively on a substantially continuous basis, by advancing them sequentially through apparatus comprising an ionisable gas-introducing station, an electric field applying region, a curable epoxy-based polymeric composition applying station, an excess airborne liquid droplet removal station and then a composition-curing station.

26. A treatment method as claimed in claim 25, in which the containers are further treated by advancing them through a curable epoxy-based polymeric second composition applying station, a second excess airborne liquid droplet removal station and then a second composition-curing station.

* * * * *